US008065071B2

(12) United States Patent
Jung et al.

(10) Patent No.: US 8,065,071 B2
(45) Date of Patent: Nov. 22, 2011

(54) INTERNAL COMBUSTION ENGINE AND ASSOCIATED OPERATING METHOD

(75) Inventors: Uwe Jung, Wörth a. d. Donau (DE); Janos Radeczky, Wenzenbach (DE); Michael Wirkowski, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 226 days.

(21) Appl. No.: 12/302,935

(22) PCT Filed: Apr. 20, 2007

(86) PCT No.: PCT/EP2007/053875
§ 371 (c)(1),
(2), (4) Date: Oct. 15, 2009

(87) PCT Pub. No.: WO2007/141083
PCT Pub. Date: Dec. 13, 2007

(65) Prior Publication Data
US 2010/0037873 A1    Feb. 18, 2010

(30) Foreign Application Priority Data
Jun. 2, 2006  (DE) .......................... 10 2006 025 927

(51) Int. Cl.
*F02B 47/08*  (2006.01)
*F02M 25/07*  (2006.01)
*F02D 41/26*  (2006.01)
(52) U.S. Cl. .................. 701/108; 701/110; 123/568.21; 123/436

(58) Field of Classification Search ............... 701/108, 701/110; 123/568.21, 436, 492, 493
See application file for complete search history.

(56) References Cited

U.S. PATENT DOCUMENTS

| 6,021,765 A | 2/2000 | DeGroot et al. ......... 123/568.21 |
| 2010/0211294 A1* | 8/2010 | Soejima ........................ 701/108 |

FOREIGN PATENT DOCUMENTS

| DE | 19961292 | 6/2001 |
| EP | 1612391 | 6/2005 |

* cited by examiner

*Primary Examiner* — Hai H Huynh
(74) *Attorney, Agent, or Firm* — King & Spalding L.L.P.

(57) ABSTRACT

In a method of operating an internal combustion engine having at least two combustion chambers, each combustion chamber contributes torque to the total torque of the internal combustion engine, and the internal combustion engine is designed in such a way that a quantity of exhaust gas can be recycled into combustion chambers. The method has the steps: (a) detecting the torque contributions of at least two combustion chambers, then (b) changing the quantity of exhaust gas recycled into the combustion chambers, the torque contribution of which has been detected in step (a), then (c) detecting the torque contributions of at least two combustion chambers, the torque contribution of which has been detected in step (a), then (d) determining the change in the torque contributions as a result of the change in the quantity of recycled exhaust gas, and then (e) outputting a signal as a function of the change in the torque contributions.

20 Claims, 2 Drawing Sheets

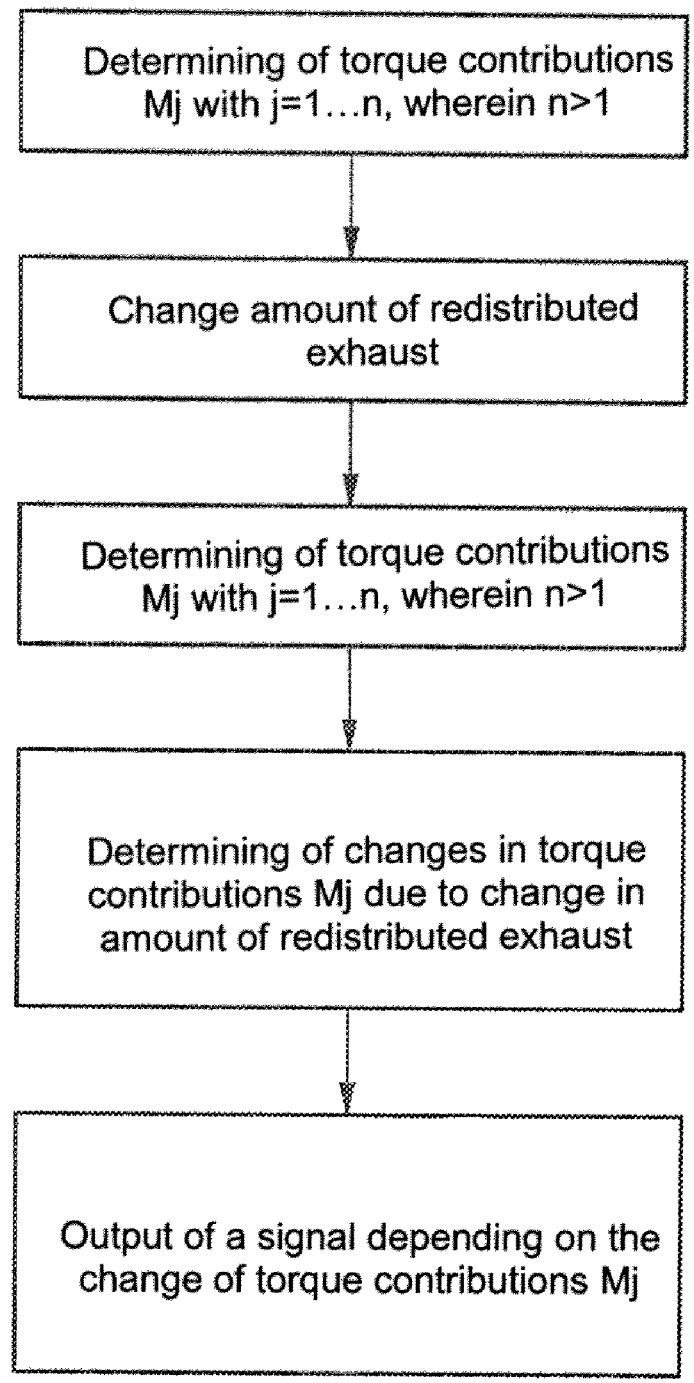

INTERNAL COMBUSTION ENGINE AND ASSOCIATED OPERATING METHOD

CROSS-REFERENCE TO RELATED APPLICATIONS

This application is a U.S. National Stage Application of International Application No. PCT/EP2007/053875 filed Apr. 20, 2007, which designates the United States of America, and claims priority to German Application No. 10 2006 025 927.0 filed Jun. 2, 2006, the contents of which are hereby incorporated by reference in their entirety.

TECHNICAL FIELD

The invention relates to a method for operating an internal combustion engine having at least two combustion chambers, each combustion chamber providing a torque contribution to a total torque of the internal combustion engine and the internal combustion engine being implemented in such a way that a quantity of exhaust gas may be recirculated into combustion chambers.

According to a second aspect, the invention relates to an internal combustion engine, in particular a piston engine, having at least two combustion chambers, each combustion chamber providing a torque contribution to a total torque of the internal combustion engine, at least one sensor for detecting the torque contribution of at least two combustion chambers, an exhaust-gas recirculation device for recirculating an exhaust gas quantity of exhaust gas from the combustion chambers back into combustion chambers, and a controller electrically connected to the at least one sensor and the exhaust gas recirculation device.

According to a third aspect, the invention relates to a computer program product.

BACKGROUND

For diesel engines in idle, controlling the injection quantity of diesel fuel individually by combustion chamber, i.e., individually by cylinder for a diesel engine, in such a way that all combustion chambers provide an essentially equal torque contribution to a total torque of the diesel engine, is known.

For pollutant reduction, in diesel engines of this type, a part of the exhaust gas is regularly recirculated into the combustion chambers. It has been shown that with increasing service life of the diesel engine, the pollutant emission, in particular the nitrogen oxide emission, rises. If an increase of the pollutant emission is established, an extensive technical diagnosis is necessary to find out the causes, to thus be able to maintain legal pollutant emission limiting values. In addition, an increased pollutant emission of diesel engines results in an increased environmental stress.

It has also been shown that the pollutant emissions differ for various diesel engines of the same manufacture. Maintaining pollutant emission limiting values is an important quality criterion. To be able to ensure the maintenance of the pollutant emission limiting values for all diesel engines from a manufacturing plant, strict manufacturing tolerances are to be maintained, which requires technically complex quality control.

SUMMARY

According to various embodiments, a method for operating an internal combustion engine, an internal combustion engine, and a computer program product can be provided, wherein disadvantages in the prior art may be reduced.

According to an embodiment, a method for operating an internal combustion engine having at least two combustion chambers, each combustion chamber providing a torque contribution to a total torque of the internal combustion engine and the internal combustion engine being implemented in such a way that a quantity of exhaust gas may be recirculated into combustion chambers, may comprise the following steps: (a) detecting the torque contributions of at least two combustion chambers, subsequently (b) changing the quantity of recirculated exhaust gas at least in the combustion chambers whose torque contribution was detected in step (a), subsequently (c) detecting the torque contributions of at least two combustion chambers whose torque contribution was detected in step (a), subsequently (d) ascertaining the change of the torque contributions as a result of the change of the quantity of recirculated exhaust gas, and subsequently (e) outputting a signal as a function of the change of the torque contributions.

According to a further embodiment, step (a) additionally may comprise: -changing operating parameters for each combustion chamber in such a way that the torque contributions of the combustion chambers are equalized to one another. According to a further embodiment, the ascertainment according to step (d) may comprise: -calculating the difference of two torque contributions obtained in step (c) and comparing the difference to a preset threshold value. According to a further embodiment, the torque contributions of all combustion chambers may be detected in steps (a) and (c). According to a further embodiment, the ascertainment according to step (d) may comprise: -for each combustion chamber, calculating the difference of the torque contributions detected in step (a) and the torque contribution detected in step (c), -calculating the absolute values of the differences, -calculating the maximum of the absolute values, and -comparing the maximum to a preset threshold value. According to a further embodiment, step (d) may comprises: calculating the difference of: the torque contributions of two combustion chambers detected in step (a) and the torque contributions of the same combustion chambers detected in step (c). According to a further embodiment, the method may comprise the following additional step before step (a): -essentially completely decreasing the quantity of recirculated exhaust gas into the combustion chambers, the change of the quantity of recirculated exhaust gas into the combustion chambers being an increase in the proportion of exhaust gas to a total combustion chamber charge, preferably to greater than 40%. According to a further embodiment, the change in step (b) can be an essentially complete decrease of the quantity of recirculated exhaust gas into the combustion chambers. According to a further embodiment, the internal combustion engine may be a piston engine and the method may be performed at essentially constant fuel supply rate, in particular during idle of the internal combustion engine. According to a further embodiment, the signal in step (e) can be a control signal for changing the quantity of the exhaust gas recirculated into one combustion chamber or multiple combustion chambers.

According to another embodiment, an internal combustion engine, in particular a piston engine, may comprise: -at least two combustion chambers, each combustion chamber providing a torque contribution to a total torque of the internal combustion engine, -at least one sensor for detecting the torque contribution of at least two combustion chambers, -an exhaust gas recirculation device for recirculating a quantity of exhaust gas from the combustion chambers back into combustion chambers, and -a controller which is electrically connected to the at least one sensor and the exhaust gas recirculation device, wherein the controller is operable to perform the above mentioned method.

According to a further embodiment, the exhaust gas recirculation device can be implemented in such a way that the recirculated quantity of recirculated exhaust gas may be regulated or controlled as a function of the combustion chamber.

According to yet another embodiment, a computer program product may comprise a computer usable medium having computer program code which may be loaded directly into the memory of a digital controller and comprises software code sections which may be executed when the product runs on the digital controller to perform the above mentioned method.

BRIEF DESCRIPTION OF THE DRAWINGS

The invention is explained in greater detail hereafter on the basis of the appended FIGS. 1 and 2.

FIG. 2 shows a flow chart of a method according to an embodiment.

DETAILED DESCRIPTION

Figure 1:
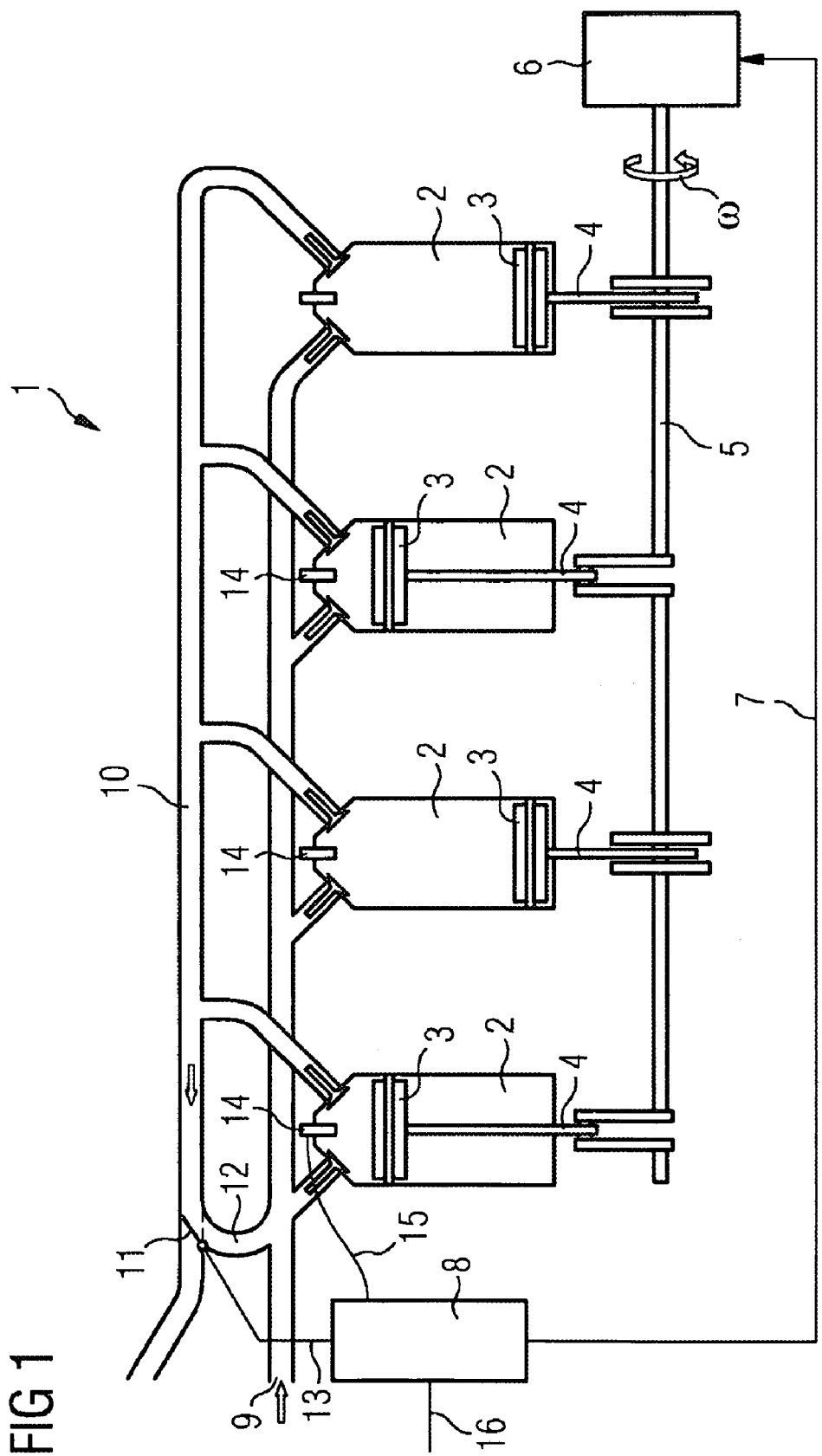
FIG. 1 shows an internal combustion engine according to an embodiment in the form of a diesel engine.

The various embodiments have the advantage that without changing the components of the internal combustion engine, an unequal distribution of the quantity of recirculated exhaust gases between the combustion chambers is detectable. Specifically, it has been shown that this unequal distribution of the recirculated exhaust gas to the combustion chambers contributes to an increase of the pollutant emission.

Deposits arise in the lines through which the exhaust gas is supplied to the individual combustion chambers during the operation of the internal combustion engine. An unequal distribution of the recirculated exhaust gas to the individual combustion chambers results therefrom.

If a proportion of exhaust gas which differs from combustion chamber to combustion chamber is added to the fuel-air mixture to be combusted, the combustion conditions also differ from combustion chamber to combustion chamber. A controller which regulates the internal combustion engine on the basis of the variables which only relate to all combustion chambers jointly may thus only inadequately control the combustion in the individual combustion chambers. The combustion conditions prevailing in a combustion chamber must then be regulated on the basis of a variable which only approximately corresponds to the variable which is decisive for the individual combustion chamber. Non-optimum control occurs, which results in increased pollutant emission, in particular of nitrogen oxides.

Such differences are recognized by the method according to an embodiment, so that countermeasures may be taken. An advantage of the various embodiments is therefore that lower pollutant emissions are achievable.

Manufacturing differences in internal combustion engines of the same manufacture also result in differing conditions in the individual combustion chambers. Using the method according to an embodiment, manufacturing differences may also be recognized and remedied during manufacturing. The manufacturing tolerances may thus be less strict, without internal combustion engines being manufactured which infringe the predefined pollutant emission limiting values.

A non-optimum combustion because of a quantity of recirculated exhaust gas which differs from combustion chamber to combustion chamber additionally lowers the service life of the internal combustion engine, which is avoided by the various embodiments.

The advantageous effects of the method according to an embodiment are possible in most cases solely by changing the controller software, which advantageously results in lower costs upon the implementation of the method.

If the internal combustion engine is a piston engine, the total torque is understood as the mean value in regard to time over a plurality of crankshaft revolutions. The torque contribution of a combustion chamber is understood as the mean value over multiple crankshaft rotational angle intervals, in which the combustion chamber provides a contribution to the total torque.

The detection of the torque contributions of at least two combustion chambers is to be understood to mean that in particular it comprises implicit detection. It is thus not necessary to measure the torques directly as torques. Implicit or indirect detection is also possible, for example, by the time-dependent measurement of the crankshaft rotational angle and the determination of the torque contributions on the basis of variations of the rotational velocity of the crankshaft: if a first combustion chamber contributes more to the total torque than a second combustion chamber, this has the result that when the first combustion chamber has a working stroke, the crankshaft experiences a greater acceleration than when the second combustion chamber has a working stroke. The mean crankshaft velocity, which is averaged over the crankshaft rotational angle range, in which a specific combustion chamber provides its torque contribution, and/or the crankshaft acceleration are therefore suitable for detecting the torque contributions of the individual combustion chambers.

If the piston engine comprises an alternator for generating electrical current, it is possible to determine the torque contribution of a combustion chamber from the peak value of the current output by the alternator and/or the output voltage. The greater the torque contribution of a combustion chamber, the greater the peak value of the current generated by the alternator when this combustion chamber has its working stroke. When a combustion chamber has its working stroke, which delivers a smaller contribution to the total torque, the peak value is less. The peak value is therefore suitable for detecting the torque contributions of individual combustion chambers.

This is also true for the time interval of the peak values from one another: the greater the torque contribution of an internal combustion engine to the total torque, the more rapidly is the peak value reached. All combustion chambers provide the same torque contribution if the interval of two peak values is always equal.

The detection of the torque contributions is therefore in particular to be understood to mean any procedure by which a statement is obtained about the torque contribution of individual combustion chambers and which is performed to arrive at this statement.

The output of a signal as a function of changes of the torque contributions also includes a signal only being output if the change of the torque contributions exceeds a preset threshold value. In particular, this comprises any signal which contains a statement about the differences in the quantity of recirculated exhaust gas and is output for this purpose.

The internal combustion engine is preferably a piston engine, in particular a diesel engine.

Step (a) may preferably comprise changing at least one operating parameter for each combustion chamber, so that the torque contributions of the combustion chambers are equal to one another. Such a procedure is advantageous in particular if the internal combustion engine is a piston engine in idle, in particular a diesel engine. In this case, the injection quantity for all injectors which inject fuel into the combustion chambers is adapted using ultra-small quantity adaptation at a specific fuel pressure. Due to this adaptation, all combustion chambers deliver an essentially equal torque contribution to the total torque.

The torque contributions of the individual combustion chambers may preferably differ by less than 6%, in particular less than 3%. For the calculation, the torque contribution of one combustion chamber is subtracted from that of the other combustion chamber, the difference is divided by the greater of the two values, the absolute value is calculated, and this value is subtracted from 1 and multiplied by 100.

The adaptation of the injection quantity is performed, for example, by a variation of the pilot injection quantity or the time of injection (TOI). Alternatively or also cumulatively, the latter is performed by the adaptation of the start of injection (SOI) and/or the end of injection (EOI).

If the torque contribution is detected multiple times in the context of the change of operating parameters for each combustion chamber, the last detected value for the torque contribution is preferably used for the detection in step (c).

According to an embodiment, step (d) of the method comprises calculating of the difference of two torque contributions obtained in step (c) and comparing the difference to a preset threshold value.

This threshold value is preferably a relative threshold value and is 6%, preferably 3%, particularly preferably 1.5%. This means that after changing the quantity of recirculated exhaust gas for a combustion chamber, two values are ascertained for the torque contribution. The difference of the greater torque value and the lesser torque value is calculated and the difference is divided by the greater torque value. The threshold value is exceeded if a value of greater than 1.06 or 1.03 or 1.015, respectively, is obtained. The torque contributions are ascertained as described above, preferably implicitly or indirectly.

In a further embodiment of the method, firstly, as described above, the injection quantity of fuel in each combustion chamber is regulated in such a way that the differences in the torque contributions of the individual combustion chambers lie below the preset threshold value. Subsequently, the quantity of recirculated exhaust gas is changed and the injection quantity of fuel is re-regulated specifically by combustion chamber in such a way that all combustion chambers again deliver essentially equal torque contribution, i.e., the differences in the torque contributions lie below the preset threshold values.

The change of the injection quantity for each combustion chamber is then a measure of the change of the torque contribution as a result of the change of the quantity of recirculated exhaust gas.

If the injection quantity must be increased by more than a preset threshold value for a combustion chamber, preferably 3%, particularly 5%, particularly preferably 10%, a warning message is preferably output.

In steps (a) and (c), the torque contributions of all combustion chambers are preferably detected. Differences between the combustion chambers in regard to the quantity of recirculated exhaust gas may then be ascertained especially well.

Step (d) preferably comprises the calculation of the difference of the torque contributions of two combustion chambers detected in step (a) and the torque contributions for each combustion chamber detected in step (c), the calculation of the absolute value of the difference and/or the absolute value of the differences, the calculation of the maximum of the absolute values thus obtained, and the comparison of the maximum to a preset threshold value.

The maximum change of the torque contributions caused by changing the quantity of recirculated exhaust gas is thus detected. Alternatively, the change of this difference because of the change of recirculated exhaust gas is detected for each combustion chamber. If this difference changes by more than a preset value, this is a sign of a significant influence of the change of the quantity of recirculated exhaust gas, so that a warning signal is preferably output.

To ascertain the change of the torque contributions, step (d) preferably comprises calculating the difference of the torque contributions of two combustion chambers detected in step (a) and the torque contributions of the same combustion chambers detected in step (c).

A method may have the following additional step before step (a): essentially complete reduction of the quantity of recirculated exhaust gas into the combustion chambers, the change of the quantity of recirculated exhaust gas into the combustion chambers being an increase, preferably to greater than 40% in relation to the total combustion chamber charge.

If the internal combustion engine is a piston engine, the total combustion chamber charge is the quantity of gas which is compressed. A proportion of 40% of the total combustion chamber charge means that the combustion chamber is filled 40% volume proportion with exhaust gas in the moment immediately before ignition. Due to the essentially complete decrease of the quantity of recirculated exhaust gas and a subsequent increase to 40%, an especially large difference in the influence of the quantity of recirculated exhaust gas is achieved, so that differences in the proportion of recirculated gas from combustion chamber to combustion chamber are detectable especially well.

Alternatively, in step (b), the quantity of recirculated exhaust gas in the combustion chambers whose torque contribution was detected in step (a) is essentially completely decreased, i.e., completely suppressed. The quantity of recirculated gas in step (a) is then preferably so high that the proportion is greater than 40%, in particular greater than 60% of the total combustion chamber charge.

In known methods for operating diesel engines, after a specific time of operation in idle, the quantity of recirculated exhaust gas is essentially completely decreased, to prevent coking of the engine. The method according to an embodiment is therefore preferably performed after a preset time of operation in idle. The method according to an embodiment can be preferably performed at constant fuel supply rate, in particular during idle of the internal combustion engine. This has the advantage that further influences, such as load changes, have no influence on the detection of the torque contributions because of the change of the quantity of recirculated exhaust gas. A high precision is thus achieved in the ascertainment of the change of the torque contributions as a result of the change of the quantity of recirculated exhaust gas.

A method in which the signal in step (e) is a control signal for changing the quantity of recirculated exhaust gas in one or more combustion chambers is especially preferable. In this case, it is advantageous that a detected uneven distribution of the recirculated exhaust gas in the individual combustion chambers is immediately changeable, so that after the adaptation of the quantity of recirculated exhaust gas individually by combustion chamber, essentially identical combustion conditions prevail in all combustion chambers.

In an internal combustion engine according to an embodiment, the exhaust-gas recirculation device is preferably implemented in such a way that the recirculated exhaust gas quantity may be regulated or controlled as a function of the combustion chamber. This has the advantage that an unequal exhaust gas recirculation among the combustion chambers may be equalized.

FIG. 1 shows a diesel engine 1, which comprises four combustion chambers 2 in the form of cylinders, in which pistons 3 run. The combustion chambers 3 are connected via connecting rods 4 to a crankshaft 5.

The combustion chambers 3 generate a total torque on the crankshaft 5 during the operation of the diesel engine 1.

If the individual combustion chambers 2 provide a differing torque contribution, this has the result that when a combustion chamber which provides a smaller contribution to the total torque has its working stroke, the crankshaft 5 is accelerated less than when a combustion chamber 2 which provides a greater torque contribution to the total torque of the crankshaft 5 has its working stroke.

The crankshaft 5 is connected to a crankshaft sensor 6, which detects the crankshaft rotational angle ω of the crankshaft 5 as a function of the time t. The time-dependent crankshaft rotational angle ω(t) contains all information which is necessary for calculating the torque contribution of the combustion chambers 2, and is transmitted through an electrical line 7 to a controller 8.

Air flows in through an air supply line 9 for operation of the diesel engine 1 and is conducted to the combustion chambers 2. The exhaust gases of the combustion chambers 2 are exhausted through an exhaust line 10 to an exhaust pipe (not shown here). A valve 11 (shown simplified as a flap in FIG. 1) is located between the combustion chambers 2 and the exhaust pipe, which may open or close a fluid connection 12 between the exhaust line 10 and the air supply line 9. The valve 11 may also partially open or close the connection 12. The valve 11 is electrically activatable and is connected using an activation line 13 to the controller 8. (A fluid is to be understood as a liquid and/or gaseous medium).

In a preferred variant (not shown here), at least one valve 11 is assigned to each individual combustion chamber 2, so that the quantity of exhaust gas which is redirected into the particular combustion chambers may be controlled and/or regulated individually by combustion chamber.

Each combustion chamber 2 has an injector 14, which injects fuel from a fuel line (not shown here) into the combustion chambers 2. All injectors 14 are connected via a control line 15 to the controller 8. For reasons of clarity, only one injector 14 is shown as connected to the control line 15. The injectors 14 and the controller 8 are implemented in such a way that an individual fuel quantity is injectable for each combustion chamber 2.

An embodiment of the method is implemented in that in idle operation, the valve 11 is closed. This prevents exhaust gas from reaching the air supply line 9. The torque contributions of individual combustion chambers 2 are then recorded via the crankshaft sensor 6 and transmitted to the controller 8. The controller 8 adapts the quantity of the fuel injected per working stroke into the combustion chambers 2 in such a way that the differences of the torque contributions of individual combustion chambers 2 to one another are less than 2%. This means that the torque of the combustion chamber which provides the greatest torque contribution to the total torque, minus the torque of the combustion chamber which provides the smallest torque contribution to the total torque of the engine, in relation to (i.e., divided by) the torque contribution of the combustion chamber which provides the greatest contribution, is less than 2%.

Subsequently, the valve 11 is opened far enough by the controller 8 that an exhaust flow flows into the air supply line 9, which makes up 40% of the total flow into the combustion chambers, so that the proportion of recirculated exhaust gas is 40% of the total combustion chamber charge.

Subsequently, the torque contributions of the individual combustion chambers are detected again according to the method described above. The injection quantity into the individual combustion chambers is again adapted by the controller 8 in such a way that it falls below the above-mentioned threshold value.

If it results that a combustion chamber exists for which the injection quantity is changed by more than 4%, in particular by more than 6%, more particularly by more than 8% in relation to the value before turning on the exhaust gas recirculation, a signal is output via a signal line 16 by the controller 8.

In an alternative embodiment, the valve 11 is first opened far enough that the proportion of recirculated exhaust gas is 40% of the total combustion chamber charge. The torque contributions of the individual combustion chambers 2 are then recorded via the crankshaft sensor 6 and transmitted to the controller 8. The controller 8 adapts the quantity of the fuel injected into the combustion chambers 2 per working stroke in such a way that the differences of the torque contributions of the individual combustion chambers 2 to one another are less than 2%.

Subsequently, the valve 11 is closed and the torque contributions of the individual combustion chambers 2 are again recorded and transmitted to the controller 8, which again adapts the quantity of fuel injected per working stroke into the combustion chambers 2 in such a way that the torque contributions of the individual combustion chambers 2 are less than 2% from one another.

If it results that a combustion chamber exists for which the injection quantity is changed by more than 4% in relation to the value before turning on the exhaust gas recirculation, a signal is again output by the controller 8 via the signal line 16.

FIG. 2 shows a flow chart of a method according to an embodiment. Therein, j is a numeric variable and n is the number of combustion chambers from which the torque contribution is detected.

In a first step S1, the torque contributions $M_j$ of the combustion chambers 2 of the diesel engine 1 are detected. For a four-cylinder diesel engine, n is greater than 1 and less than or equal to 4, so that the torque contributions $M_j$ of 2, 3, or 4 combustion chambers are detected. It is favorable to detect the torque contributions $M_j$ of all combustion chambers, in the present example, thus the torque contributions $M_1$, $M_2$, $M_3$, and $M_4$.

In a subsequent second step S2, the quantity of recirculated exhaust gas is changed, i.e., increased or decreased. The quantity of recirculated exhaust gas is increased in this step at least for those combustion chambers whose torque contributions were ascertained in a first step. It is favorable to change the quantity of recirculated exhaust gas for all combustion chambers and in the same way, for example, by opening the valve 11 (cf. FIG. 1).

Subsequently, in a third step S3, torque contributions $M_j$ are again detected, specifically of at least two combustion chambers whose torque contributions were detected in the first step. Thus, for example, if the torque contributions $M_1$, $M_2$, and $M_3$ of the first, the second, and the third combustion chambers were detected in the first step, it is sufficient if the torque contributions $M_1$ and $M_2$ of the first and the second combustion chambers are detected in the third step. However, the torque contributions of all combustion chambers are preferably detected whose torque contributions were already detected in the first step.

In a fourth step S4, the change of the particular torque contributions as a result of the change of the quantity of recirculated exhaust gas is ascertained. If differences result between the particular changes of the individual combustion chambers from one another, this is an indication that the quantities of recirculated exhaust gas differ from combustion chamber to combustion chamber.

For example, in the four-cylinder diesel engine selected as an example, if all four combustion chambers have a proportion of 25% of the total torque without exhaust gas recirculation and, after an increase of the quantity of recirculated exhaust gas, with otherwise identical operating parameters of the diesel engine, if the first combustion chamber still has a proportion of only 20%, but the second combustion chamber has a proportion of 30% of the total torque, this is an indication that the quantity of exhaust gas recirculated into the first combustion chamber differs from the quantity of exhaust gas recirculated into the second combustion chamber.

As a function of the change of the torque contributions $M_j$, a signal is subsequently output in a fifth step S5. In the exemplary case described above, the change of the torque contribution for the first combustion chamber is 5%. This value is compared to a preset value, such as 4%. Upon exceeding this preset value, as provided here, a warning signal is then output, for example, which indicates that a maintenance of the diesel engine is to be performed.

What is claimed is:

1. A method for operating an internal combustion engine having at least two combustion chambers, each combustion chamber providing a torque contribution to a total torque of the internal combustion engine and the internal combustion engine being implemented in such a way that a quantity of exhaust gas may be recirculated into combustion chambers, the method comprising the following steps:
   (a) detecting the torque contributions of at least two combustion chambers, subsequently
   (b) changing the quantity of recirculated exhaust gas at least in the combustion chambers whose torque contribution was detected in step (a), subsequently
   (c) detecting the torque contributions of at least two combustion chambers whose torque contribution was detected in step (a), subsequently
   (d) ascertaining the change of the torque contributions as a result of the change of the quantity of recirculated exhaust gas, and subsequently
   (e) outputting a signal as a function of the change of the torque contributions.

2. The method according to claim 1,
   wherein step (a) additionally comprises:
      changing operating parameters for each combustion chamber in such a way that the torque contributions of the combustion chambers are equalized to one another.

3. The method according to claim 2,
   wherein the ascertainment according to step (d) comprises:
      calculating the difference of two torque contributions obtained in step (c) and comparing the difference to a preset threshold value.

4. The method according to claim 1,
   wherein
   the torque contributions of all combustion chambers are detected in steps (a) and (c).

5. The method according to claim 4,
   wherein the ascertainment according to step (d) comprises:
      for each combustion chamber, calculating the difference of the torque contributions detected in step (a) and the torque contribution detected in step (c),
      calculating the absolute values of the differences,
      calculating the maximum of the absolute values, and
      comparing the maximum to a preset threshold value.

6. The method according to claim 1,
   wherein
   step (d) comprises:
   calculating the difference of:
   the torque contributions of two combustion chambers detected in step (a) and
   the torque contributions of the same combustion chambers detected in step (c).

7. The method according to claim 1,
   comprising the following additional step before step (a):
      essentially completely decreasing the quantity of recirculated exhaust gas into the combustion chambers,
      the change of the quantity of recirculated exhaust gas into the combustion chambers being an increase in the proportion of exhaust gas to a total combustion chamber charge or to greater than 40%.

8. The method according to claim 1, wherein the change in step (b) is an essentially complete decrease of the quantity of recirculated exhaust gas into the combustion chambers.

9. The method according to claim 1,
   wherein
   the internal combustion engine is a piston engine and the method is performed at essentially constant fuel supply rate or during idle of the internal combustion engine.

10. The method according to claim 1,
    wherein
    the signal in step (e) is a control signal for changing the quantity of the exhaust gas recirculated into one combustion chamber or multiple combustion chambers.

11. An internal combustion engine or a piston engine, comprising:
    at least two combustion chambers, each combustion chamber providing a torque contribution to a total torque of the internal combustion engine,
    at least one sensor for detecting the torque contribution of at least two combustion chambers,
    an exhaust gas recirculation device for recirculating a quantity of exhaust gas from the combustion chambers back into combustion chambers, and
    a controller which is electrically connected to the at least one sensor and the exhaust gas recirculation device,
    wherein the controller is operable to detect first torque contributions of at least two combustion chambers, subsequently to change the quantity of recirculated exhaust gas at least in the combustion chambers whose torque contribution was detected, subsequently to detect second torque contributions of the at least two combustion chambers, subsequently to ascertain the change of the torque contributions as a result of the change of the quantity of recirculated exhaust gas, and subsequently to output a signal as a function of the change of the torque contributions.

12. The internal combustion engine according to claim 11,
    wherein the exhaust gas recirculation device is implemented in such a way that the recirculated quantity of recirculated exhaust gas may be regulated or controlled as a function of the combustion chamber.

13. A computer program product comprising a computer usable medium having computer program code which may be loaded directly into the memory of a digital controller and comprises software code sections which may be executed, when the product runs on the digital controller to perform the steps of: detecting first torque contributions of at least two combustion chambers, subsequently changing the quantity of recirculated exhaust gas at least in the combustion chambers whose torque contribution was detected, subsequently detecting second torque contributions of the at least two combustion chambers, subsequently ascertaining the change of the torque contributions as a result of the change of the quantity of recirculated exhaust gas, and subsequently outputting a signal as function of the change of the torque contributions.

14. The computer program product according to claim 13, wherein the step of detecting the torque contributions additionally comprises: changing operating parameters for each combustion chamber in such a way that the torque contributions of the combustion chambers are equalized to one another.

15. The computer program product according to claim 14, wherein the step of ascertaining comprises: calculating the difference of the second torque contributions and comparing the difference to a preset threshold value.

16. The computer program product according to claim 13, wherein the step of ascertaining comprises: for each combustion chamber, calculating the difference of the first and second torque contributions, calculating the absolute values of the differences, calculating the maximum of the absolute values, and comparing the maximum to a preset threshold value.

17. The computer program product according to claim 13, wherein the step of ascertaining comprises:
calculating the difference of:
the first torque contributions of two combustion chambers and
the second torque contributions of the same combustion chambers.

18. The computer program product according to claim 13, comprising the following additional step:
essentially completely decreasing the quantity of recirculated exhaust gas into the combustion chambers,
the change of the quantity of recirculated exhaust gas into the combustion chambers being an increase in the proportion of exhaust gas to a total combustion chamber charge or to greater than 40%.

19. The computer program product according to claim 13, wherein the step of changing is an essentially complete decrease of the quantity of recirculated exhaust gas into the combustion chambers.

20. The computer program product according to claim 13, wherein the internal combustion engine is a piston engine and the method is performed at essentially constant fuel supply rate or during idle of the internal combustion engine.

\* \* \* \* \*